(12) United States Patent
Freiheit

(10) Patent No.: US 12,183,212 B2
(45) Date of Patent: *Dec. 31, 2024

(54) SYSTEM FOR ELECTRIC AIRCRAFT NAVIGATION

(71) Applicant: BETA AIR, LLC, South Burlington, VT (US)

(72) Inventor: Collin Freiheit, Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 269 days.

This patent is subject to a terminal disclaimer.

(21) Appl. No.: 17/739,471

(22) Filed: May 9, 2022

(65) Prior Publication Data

US 2022/0406196 A1 Dec. 22, 2022

Related U.S. Application Data

(63) Continuation-in-part of application No. 17/348,869, filed on Jun. 16, 2021, now Pat. No. 11,353,889.

(51) Int. Cl.
*G08G 5/00* (2006.01)
*B64C 39/02* (2023.01)
(Continued)

(52) U.S. Cl.
CPC ......... *G08G 5/0021* (2013.01); *G08G 5/0065* (2013.01); *G08G 5/0069* (2013.01);
(Continued)

(58) Field of Classification Search
CPC .. G08G 5/0021; G08G 5/0065; G08G 5/0069; G08G 5/0086; G08G 5/025; G08G 5/00; B64C 39/024; B64C 13/18; B64C 13/22; B64C 29/00; B64C 29/0025; B64C 39/02; B64U 2101/30; B64U 2201/10; B64U 10/20; B64U 50/13; B64D 27/24; B64D 43/00; B64D 45/00; B64D 45/04; G01C 23/00; G05D 1/0072; G05D 1/0088;
(Continued)

(56) References Cited

U.S. PATENT DOCUMENTS 6,112,141 A 8/2000 Briffe et al.
6,587,960 B1 7/2003 Barford et al.
(Continued)

OTHER PUBLICATIONS

Title: Control Concepts for Simplified Vehicle Operations of a Quadrotor eVTOL Vehicle by: Thomas Lombaerts Date: Jun. 19, 2020.
(Continued)

*Primary Examiner* — Yonel Beaulieu
(74) *Attorney, Agent, or Firm* — Brake Hughes Bellermann LLP

(57) ABSTRACT

A system for electric aircraft navigation includes a sensor configured to detect a navigation signal, a flight controller, wherein the flight controller is configured to receive the navigation signal, identify a navigation status as a function of the navigation signal, and determine an aircraft adjustment as a function of the navigation status, and a pilot display, wherein the pilot display is configured to display the aircraft adjustment to a user, and present an autonomous function configured to enact the aircraft adjustment automatically.

20 Claims, 6 Drawing Sheets

(51) Int. Cl.
  *G07C 5/00* (2006.01)
  *G08G 5/02* (2006.01)
  *B64U 10/20* (2023.01)
  *B64U 50/13* (2023.01)
  *B64U 101/30* (2023.01)

(52) U.S. Cl.
  CPC .......... *G08G 5/0086* (2013.01); *G08G 5/025* (2013.01); *B64U 10/20* (2023.01); *B64U 50/13* (2023.01); *B64U 2101/30* (2023.01); *B64U 2201/00* (2023.01); *B64U 2201/10* (2023.01)

(58) Field of Classification Search
  CPC .......... G05D 1/101; G05D 1/00; G06N 20/00; G06N 3/08; G07C 5/0808; G07C 5/0825; G07C 5/00
  See application file for complete search history.

(56) References Cited

U.S. PATENT DOCUMENTS

| | | | |
|---|---|---|---|
| 8,380,367 | B2 | 2/2013 | Schultz et al. |
| 9,847,034 | B1 | 12/2017 | Plawecki |
| 10,351,235 | B2 | 7/2019 | Karem |
| 10,593,217 | B2 | 3/2020 | Shannon |
| 10,791,427 | B1 | 9/2020 | Mueller |
| 10,861,341 | B2 | 12/2020 | Samuthirapandian et al. |
| 11,353,889 | B1 * | 6/2022 | Freiheit ................ G07C 5/0825 |
| 2008/0065275 | A1 | 3/2008 | Vizzini |
| 2010/0292871 | A1 | 11/2010 | Schultz et al. |
| 2014/0257602 | A1 | 9/2014 | Gaston |
| 2015/0378936 | A1 | 12/2015 | Danielsson et al. |
| 2016/0379499 | A1 | 12/2016 | Balasubramanian et al. |
| 2018/0134410 | A1 | 5/2018 | Fymat |
| 2019/0047342 | A1 | 2/2019 | Dietrich |
| 2019/0340933 | A1 | 11/2019 | Villa |
| 2020/0118450 | A1 | 4/2020 | Gariel |
| 2020/0184830 | A1 | 6/2020 | Samuthirapandian et al. |
| 2020/0198782 | A1 | 6/2020 | Li |
| 2021/0016875 | A1 | 1/2021 | Grabowski |
| 2024/0051679 | A1 * | 2/2024 | Bosson ................ G08G 5/0043 |

OTHER PUBLICATIONS

Title: A vision-based navigation method for eVTOL final approach in urban air mobility (UAM) by: Siyuan Ye Date: Dec. 20, 2020.

* cited by examiner

SYSTEM FOR ELECTRIC AIRCRAFT NAVIGATION

CROSS-REFERENCE TO RELATED APPLICATIONS

This application is a continuation-in-part of Non-provisional application Ser. No. 17/348,869 filed on Jun. 16, 2021, now U.S. Pat. No. 11,353,889, and entitled "SYSTEMS FOR ELECTRIC AIRCRAFT NAVIGATION," the entirety of which is incorporated herein by reference.

FIELD OF THE INVENTION

The present invention generally relates to the field of electrically propelled vehicles. In particular, the present invention is directed to a system for electric aircraft navigation.

BACKGROUND

In electrically propelled vehicles, such as an electric vertical takeoff and landing (eVTOL) aircraft, it is essential to control and maintain the aircraft. In some flights, a pilot may be unable to control and/or navigate the aircraft at all times.

SUMMARY OF THE DISCLOSURE

In an aspect, a system for electric aircraft navigation includes a sensor configured to detect a navigation signal, a flight controller, wherein the flight controller is configured to receive the navigation signal, determine an aircraft adjustment as a function of the navigation signal, and generate an autonomous function configured to enact the aircraft adjustment in part by controlling at least a propulsor of the electric aircraft, wherein the at least a propulsor is electrically powered, and a pilot display located within the electric aircraft, wherein the pilot display is configured to display the aircraft adjustment to a user.

In another aspect, an exemplary method of electric aircraft navigation includes detecting, using a sensor, a navigation signal, receiving, using a flight controller, the navigation signal, determining, using the flight controller, an aircraft adjustment as a function of the navigation signal, generating, using the flight controller, an autonomous function configured to enact the aircraft adjustment in part by controlling at least a propulsor of an electric aircraft, wherein the at least a propulsor is electrically powered, and display, using a pilot display located within the electric aircraft, the aircraft adjustment to the user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
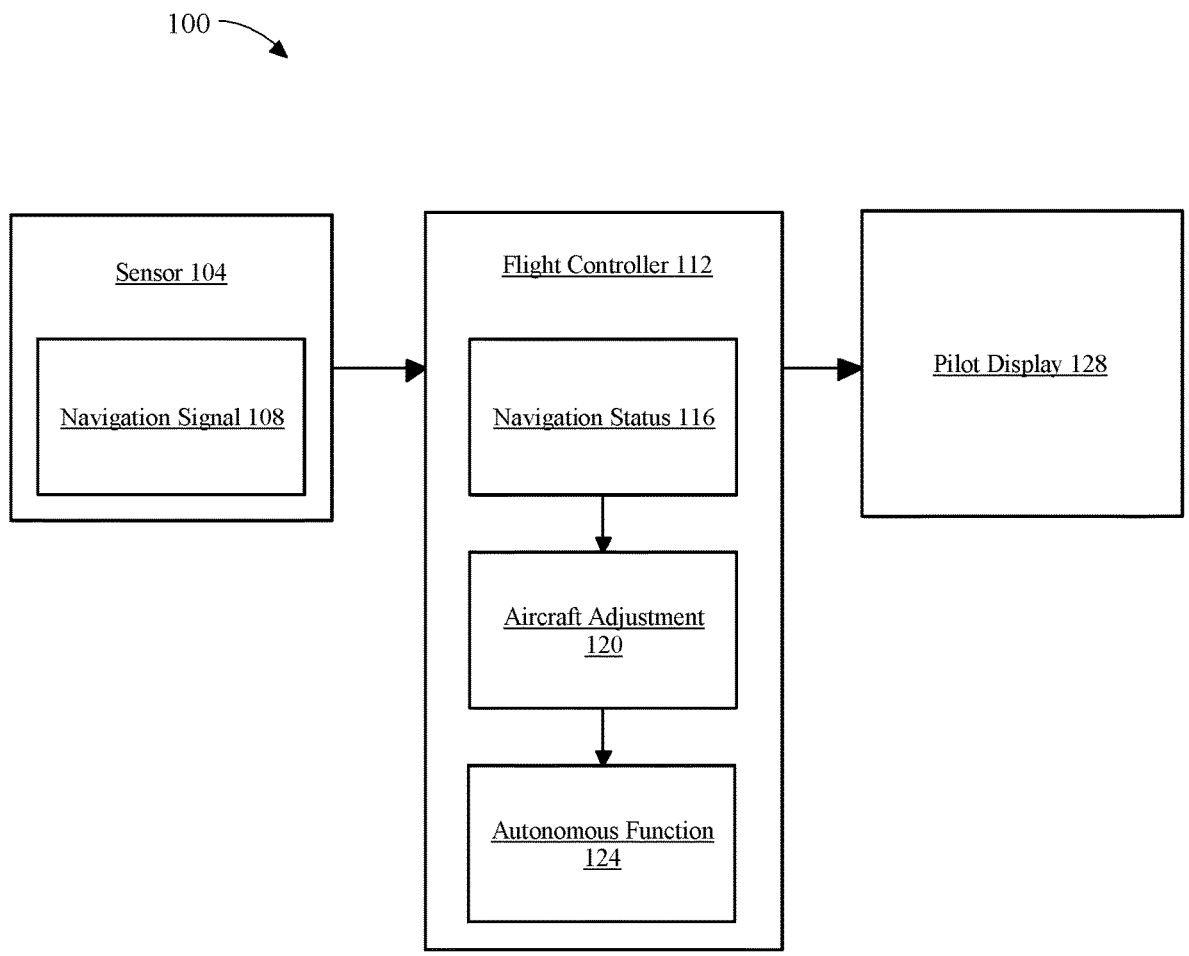
FIG. 1 is a block diagram of an exemplary embodiment of a system for electric aircraft navigation.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to an aircraft for fixed pitch lift. In an embodiment, this disclosure includes an aircraft configured to include a fuselage and a plurality of flight components attached to the fuselage. Aspects of the present disclosure include at least a lift propulsor configured to produce a lift as a function of a fixed angle of attack. Aspects of the present disclosure include at least a pusher component configured to produce a forward thrust. Aspects of the present disclosure allow for an aircraft for fixed pitch lift. Exemplary embodiments illustrating aspects of the present disclosure are described below in the context of several specific examples.

At a high level, aspects of the present disclosure are directed to a system for electric aircraft navigation. Aspects of the present disclosure can include a sensor that detects a navigation signal. Aspects of the present disclosure can also be used to determine an aircraft adjustment using a flight controller. This is so, at least in part, because the flight controller identifies a navigations status. Aspects of the present disclosure allow for presenting an autonomous function on a pilot display. Exemplary embodiments illustrating aspects of the present disclosure are described below in the context of several specific examples.

Referring now to FIG. 1, an exemplary embodiment of a system 100 for electric aircraft navigation is illustrated. As used in this disclosure an "aircraft" is vehicle that may fly by gaining support from the air. As a non-limiting example, aircraft may include airplanes, helicopters, airships, blimps, gliders, paramotors, and the like thereof. Aircraft may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate the plane after landing.

Still referring to FIG. 1, system 100 is configured to comprise a sensor 104. As used in this disclosure a "sensor" is a device, module, and/or subsystem, utilizing any hardware, software, and/or any combination thereof to detect events and/or changes in the instant environment and transmit the information. Sensor 104 may be attached via a mechanically and/or communicatively coupled, as described above, to aircraft. For example, and without limitation, sensor 104 may include a potentiometric sensor, inductive sensor, capacitive sensor, piezoelectric sensor, strain gauge sensor, variable reluctance sensor, and the like thereof. Sensor 104 may include one or more environmental sensors, which may function to sense parameters of the environment surrounding the aircraft. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 104 may include a geospatial sensor. Sensor 104 may be located inside aircraft; and/or be included in and/or attached to at least a portion of the aircraft. Sensor 104 may include one or more proximity sensors, displacement sensors, vibration sensors, and the like thereof. Sensor 104 may be used to monitor the status of aircraft for both critical and non-critical functions. Sensor 104 may be incorporated into vehicle or aircraft or be remote. Sensor 104 may be communicatively connected to an energy source and/or motor, wherein an energy source and motor are described in detail below, in reference to FIG. 3, and wherein sensor detects one or more conditions of the energy source and/or motor.

Still referring to FIG. 1, sensor 104 is configured to detect a navigation signal 108. As used in this disclosure a "navigation signal" is one or more signals denoting an aircraft's flight and/or navigation. In an embodiment, and without limitation, navigation signal 108 may denote one or more voltage levels, electromotive force, current levels, temperature, current speed of rotation, and the like thereof. In another embodiment, navigation signal 108 may denote one or more electrical parameters of a flight component such as a voltage, current, and/or ohmic resistance of a flight component, wherein a flight component is described below in detail in reference to FIG. 2. In another embodiment, and without limitation, navigation signal 108 may include one or more signals relating to altitude, airspeed velocity, groundspeed velocity, direction during flight, thrust, torque, heading direction, braking force, frictional force, aerodynamic drag, orientation with respect to a reference point, and the like thereof. For example, and without limitation, navigation signal 108 may denote that aircraft is traveling west with an airspeed velocity of 460 knots. As a further non-limiting example, navigation signal 108 may denote that aircraft is climbing at a 2° pitch angle. As a further non-limiting example, navigation signal 108 may denote that aircraft is exerting 2,000 N of forward thrust, wherein there is 20 N of aerodynamic drag in the opposite direction.

Still referring to FIG. 1, sensor 104 may include a navigation facility receiver. As used in this disclosure a "navigation facility receiver" is sensor and/or receiver that may locate and/or identify a location of an aircraft with respect to a geolocation. For example and without limitation, navigation facility receiver may include a global positioning system (GPS) receiver. As a further non-limiting example, navigation facility receiver may include a global navigation satellite system (GLONASS) receiver. As a further non-limiting example, navigation facility receiver may include a BeiDou receiver. As a further non-limiting example, navigation facility receiver may include a Galileo receiver. As a further non-limiting example, navigation facility may include a NAVIC receiver. In an embodiment, navigation facility system may include one or more satellite constellation receivers and/or similar emitting systems that can calculate a location based on the time and/or phase difference of the receiver signals. In an embodiment, and without limitation, navigation facility receiver may include a receiving antenna, accompanying circuits, and processing. One or more navigation facility receivers may be configured to determine the orientation of the aircraft in relation to the Earth's true North, using differential GPS, phase differences, and/or other methods to exploit the satellite constellations and their positions. One or more facility navigation receivers may be configured to receive and determine the local time based on the time information received from the satellite signals. One or more navigation facility receivers may receive position and timing signals, and the like and convert such detected signals into electrical signals, which may be processed further by flight controller 112 as described in further detail below.

Still referring to FIG. 1, sensor 104 may include an optical sensor. As used in this disclosure an "optical sensor" is an electronic device that alters any parameter of an electronic circuit when contacted by visible or MR light. Optical detectors may include, without limitation, charge-coupled devices (CCD), photodiodes, avalanche photodiodes (APDs), silicon photo-multipliers (SiPMs), complementary metal-oxide-semiconductor (CMOS), scientific CMOS (sC-MOS), micro-channel plates (MCPs), micro-channel plate photomultiplier tubes (MCP-PMTs), single photon avalanche diode (SPAD), Electron Bombarded Active Pixel Sensor (EBAPS), quanta image sensor (QIS), spatial phase imagers (SPI), quantum dot cameras, image intensification tubes, photovoltaic imagers, optical flow sensors and/or imagers, photoresistors and/or photosensitive or photon-detecting circuit elements, semiconductors and/or transducers. APDs, as used herein, are diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs may provide a built-in stage of gain through avalanche multiplication. When a reverse bias is less than breakdown voltage, a gain of an APD may be approximately linear. For silicon APDs this gain may be on the order of 10-100. The material of the APD may contribute to gains.

Still referring to FIG. 1, optical sensor may be configured to identify a topographical datum. As used in this disclosure a "topographical datum" is an element of datum representing the arrangement and/or location of a physical feature of a geolocation. For example, and without limitation, topographical datum may include one or more elements of datum denoting a mountain range, skyscraper, river, ridge, ocean, lake, vehicle, animal, person, street, field, tree, and the like thereof. In an embodiment, and without limitation, optical sensor may include a light radar component. As used in this disclosure a "light radar component" is an active imaging source that transmits light toward an object or field of interest and detects back-scattered or reflected light, measuring time of flight (ToF), interferometry, and/or phase of such back-scattered and/or reflected light to compute distances to, velocities, and/or accelerations of objects at points from which back-scatter and/or reflection occurred. In an embodiment, the wavelength of light may be outside the range of visible light; for instance, and without limitation, wavelength may be in the infrared range as described above. Light radar component may include a "flash lidar" component, mechanical or non-mechanical beam steering, light patterns, and/or computational imaging methods, such as plenoptic or other multi-aperture embodiments. In an embodiment, and without limitation, light radar component may include one or more optical elements for focusing, collimating, and/or transmitting light emitted by light source. In an embodiment, intensity and/or focus may default to minimally harmful settings, permitting allowing ToF ranging or the like to determine a distance to a nearest topographical data point and/or ground point. Light radar component may include detectors that may be sensitive specifically to a narrow band of wavelengths transmitted by light source, and/or may be sensitive to a range of wavelengths that includes the band transmitted by the light source. Detectors may be designed to react quickly to initial detection of photons, for instance through use of APDs or other highly sensitive detectors.

In an embodiment, and still referring to FIG. 1, optical sensor may be configured to calculate an in-air position as a function of the topographical datum. As used in this disclosure an "in-air position" is a relative location and/or orientation of an aircraft relative to the topographical datum. For example, and without limitation, optical sensor may perform a ToF calculation as a function of the one or more light radar components by firing pulses of light and measuring time required for a backscattered and/or reflected pulse to return. As a further non-limiting example, ToF may be used to measure a distance from light radar component to a point from which light is scattered; this may be used, without limitation, to detect distance to a topographical datum such as a building. Distance may be computed using a single reading of ToF, by averaging two or more ToF readings, and/or measuring multiple returns to reduce false readings from clutter. ToF may be used to detect edges of objects such as an edge of a cliff. ToF may be used to generate an image, for instance by repeatedly capturing readings of ToF to different portions of an object and/or topographical datum; a three-dimensional surface contour of the object, such as facial features, details of an object a person is holding, or the like, may be rendered using the ToF data. ToF measurements may be processed to generate a depth map or point cloud, defined for the purposes of this disclosure as a set of Z-coordinate values for every pixel of the image, which may be measured in units of millimeters, micrometers, or the like. Depth map data may be combined with other imaging data; for instance, intensity or phase values of pixels in an infrared reading may be measured as proportional to an amount of light returned from a scene.

Still referring to FIG. 1, sensor 104 may include a ranging sensor. As sued int his disclosure a "ranging sensor" is an electronic device that receives, stores, and/or transmits one or more elements of spatial information. For example, and without limitation, ranging sensor may receive a temporal indicator. As used in this disclosure a "temporal indicator" is an element of datum denoting a time and/or temporal element. For example, and without limitation, temporal indicator may include a time period, wherein a time period is a magnitude of time elapsed, such as but not limited to seconds, minutes, hours, days, weeks, months, years, and the like thereof. For example, and without limitation, temporal indicator may denote a time period that aircraft has been in flight and/or traveling in a medium, such as but not limited to air. As a further non-limiting example, temporal indicator may denote a time period that aircraft has been idling and/or stationary. As a further non-limiting example, temporal indicator may denote a time period that aircraft has been at a cruising altitude. As a further non-limiting example, temporal indicator may denote a time period that aircraft has been climbing and/or descending from a cruising altitude. As a further non-limiting example, temporal indicator may denote a time period that a motor has been expending energy. As a further non-limiting example, temporal indicator may denote a time period that a torque and/or thrust has been exerted by a flight component, wherein a flight component is described below in detail.

In an embodiment, and still referring to FIG. 1, ranging sensor may be configured to calculate a distance as a function of the temporal indicator and the navigation signal. As used in this disclosure a "distance" is a measurement of travel and/or progress that has progressed. For example, and without limitation distance may denote a number of kilometers and/or miles that have been traveled. As a further non-limiting example, distance may denote a progression of distance traveled as a function of a required distance to be traveled. In an embodiment, distance may denote one or more replacement points. As used in this disclosure a "replacement point" is a distance and/or progression interval in which a component and/or aircraft has deteriorated. For example, and without limitation, replacement point may denote that an aircraft has 1200 km remaining prior to requiring maintenance. As a further non-limiting example, replacement point may denote that a flight component has 5% remaining prior to requiring a replacement component.

Still referring to FIG. 1, navigation signal 108 may include an inertial measurement. As used in this disclosure an "inertial measurement" is an element of datum denoting one or more forces, angular rates, and/or orientations. For example, and without limitation, inertial measurement may include a measurement of 5 m/s$^2$ for an aircrafts acceleration in a northeastern direction. In an embodiment, inertial measurement may include generating a moving map display. As used in this disclosure a "moving map display" is a digital map archive representing one or more position outputs. For example, and without limitation, moving map display may identify one or more movements, orientations, and/or velocities of aircraft over a digital map. In an embodiment, and without limitation, inertial measurement may be determined as a function of magnetic sensors or magnetometers such as Hall effect sensors, compasses such as solid-state compasses, or the like; one or more magnetometers may include a plurality of magnetometers, such as three or more magnetometers positioned to span three dimensions of possible orientation, so that any direction and magnitude of change in magnetic field in three dimensions may be detected and measured in three dimensions, possibly for measurement of the aircraft's orientation to the Earth's true North or detection of magnetic anomalies. In another embodiment, inertial measurement may be determined as a function of a MEMS sensor, inertial measurement unit (IMU), an accelerometer, wherein one or more accelerometers may include a plurality of accelerometers, such as three or more accelerometers positioned to span three dimensions of possible acceleration, so that any direction and magnitude of acceleration in three dimensions may be detected and measured in three dimensions, and the like thereof. In another embodiment, and without limitation, inertial measurement may be determined as a function of one or more gyroscopes; one or more gyroscopes may include a plurality of gyroscopes, such as three or more gyroscopes positioned to span three dimensions of possible acceleration, so that any direction and magnitude of change in angular position in three dimensions may be detected and measured in three dimensions.

Still referring to FIG. 1, according to some embodiments, sensor 104 may include any of an electro-optical sensor, an imager, a machine-vision system, a high-speed camera, a thermal imaging camera, a multispectral camera, a pressure sensor, and the like. In some cases, sensor 104 may be configured to sense a characteristic of an electric motor, such as without limitation as is on a propulsor. In some cases, sensor 104 may be configured to sense any motor characteristic including, without limitation, current, vibration, stray flux, light polarization changes resulting from external magnetic field according to Faraday principle, partial discharge, acoustics, temperature, and the like. In some cases, sensor may be configured to sense a characteristic associated with a motor at a substantially steady-state. For example, in some cases motor current signal analysis may be performed under state-state motor conditions. Alternatively, sensor 104 may be configured to sense a characteristic associated with motor in a transient operating condition. Non-limiting exemplary transient operating conditions include motor start-up, motor load variations, plugging stop, regenerative braking, dynamic braking, acceleration, deceleration, supply frequency changes, and the like. In some cases, sensor 104 may sense a motor characteristic which may be further analyzed, for example by way of one or more transforms. In some cases, motor characteristic may be analyzed using a time-frequency transform. Non-limiting time-frequency transforms may include any of discrete wavelet transform, undecimated discrete wavelength transform, wavelet packets, continuous wavelet transform, Hilbert-Huang transform, Wigner-Ville distribution, Choi-Williams distribution, and the like. In some cases, a discrete transform (e.g., discrete wavelet transform) may be advantageously utilized for continual monitoring of motor, because of reducing processing requirements of the discrete transform. Alternative or additionally, a continuous transform may be used for finer more accurate analysis. In some cases, a time-frequency transform may be used to analyze a motor current draw signal. Alternatively or additionally a time-frequency transform may be used to analyze a motor vibration signal, a stray flux signal, and/or an optical polarization signal. An exemplary embodiment is provided below in which transient analysis of motor current during startup is analyzed using time-frequency transform.

Still referring to FIG. 1, evolution of frequency over time during transient motor conditions may be indicative of motor health. In some cases, steady state motor conditions may be used. For example, lower sideband harmonics and/or upper sideband harmonics present under steady state conditions may be indicative of motor rotor damage. Alternatively or additionally, in some cases, it may be advantageous to sense and analyze motor characteristics during transient motor states. As an electric motor undergoes startup, frequency, as revealed through a time-frequency transform of motor current, evolves over time. Transient motor condition analysis may be used because generally fault harmonics, which fall at specific frequency values at steady-state (e.g., sidebands), change in frequency and time under transient operation. As an exemplary embodiment, Lower Sideband Harmonic (LSH), which may be associated with rotor damages, may be detected during motor startup. LSH frequency may be given as $$f_{LSH} = f*(1-2*s)$$

where $f_{LSH}$ is lower sideband harmonic frequency, f is supply frequency, and s is slip. Slip may be given as $$s = \frac{n_s - n}{n_s}$$

where $n_s$ is synchronous speed, and n is motor speed. Under steady-state motor conditions, LSH frequency will remain substantially stable. However, under transient motor conditions LSH frequencies may change in a characteristic manner, in coherence with variation of the above parameters. For instance, during direct stating of an induction motor slip decreases from s =1 (when motor is connected) to near zero (when steady-state regime is reached) Consequently, frequency of LSH may evolve in a predictable manner during startup. For example, $f_{LSH}$ may be substantially equal to supply frequency at startup, drop to nearly zero, and then increase again to about equal to that the supply frequency. Frequency evolution for lower sideband harmonics may therefore exhibit a telltale V-pattern during startup, when time-frequency transform of motor current is plotted. Time-frequency transform analysis has been shown to be useful with a motor current signal, in some cases, time-frequency transform analysis may be used on other motor signals to determine motor health.

Still referring to FIG. 1, system 100 is configured to comprise a flight controller 112. As used in this disclosure a "flight controller" is a computing device of a plurality of computing devices dedicated to data storage, security, distribution of traffic for load balancing, and flight instruction. Flight controller 112 may include and/or communicate with any computing device as described in this disclosure, including without limitation a microcontroller, microprocessor, digital signal processor (DSP) and/or system on a chip (SoC) as described in this disclosure. Further, flight controller 112 may include a single computing device operating independently, or may include two or more computing device operating in concert, in parallel, sequentially or the like; two or more computing devices may be included together in a single computing device or in two or more computing devices. In embodiments, flight controller 112 may be installed in an aircraft, may control the aircraft remotely, and/or may include an element installed in the aircraft and a remote element in communication therewith. In an embodiment, and without limitation, flight controller 112 may be configured to command a plurality of flight components, wherein flight components are described in detail below, in reference to FIG. 2.

Still referring to FIG. 1, flight controller 112 is configured to receive the navigation signal 108. Flight controller 112 may receive navigation signal 108 as a function of one or more communication networks. As used in this disclosure a "communication network" is one or more data flow paths that allow for a transmission and/or carriage of information from one device to another. In an embodiment, and without limitation, communication network may allow flight controller 112 to receive navigation signal 108 as a function of a wired protocol. As a non-limiting example, a wired protocol may include transmission of data using a master bus controller, universal asynchronous receiver-transmitters (UART), universal serial buses (USBs), bus architectures, and the like thereof. In another embodiment, and without limitation, communication network may allow flight controller 112 to receive navigation signal 108 as a function of a wireless protocol. For example, and without limitation, wireless protocol may include transmission of data using a radio wave, electric field, mobile broadband, Wi-Fi, and/or the BLUETOOTH protocol promulgated by Bluetooth SIG, Inc. of Kirkland, Washington, wherein Bluetooth is a wireless technology used for exchanging data between devices over short distances using ultra high frequency radio waves between 2.402 GHz to 2.480 GHz. as a function of cooperative processing, parallel processing, and the like thereof.

Still referring to FIG. 1, flight controller 112 is configured to identify a navigations status 116 as a function of the navigation signal 108. As used in this disclosure a "navigation status" is a status and/or representation of an aircraft during travel. For example, navigation status 116 may denote that an aircraft is following a flight plan and will achieve the predicted landing time. In an embodiment, navigations status 116 may be identified as a function of determining a directional vector. As used in this disclosure a "directional vector" is a data structure that represents one or more a quantitative values and/or measures direction. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes. For example, and without limitation, directional vector may denote that aircraft is traveling with a force of 300 N in a southern direction with an airspeed velocity of 400 knots.

Still referring to FIG. 1, flight controller 112 may identify navigations status 116 as a function of determining a flight progress. As used in this disclosure a "flight progress" is a measurable value associated with the movement of an aircraft towards a destination. In an embodiment, and without limitation, flight progress may include a measurable percentage and/or ratio to denote a distance traveled relative to the total distance required. As a non-limiting example, flight progress may be a value of 73%. In another embodiment, flight progress may denote that an aircraft still have a certain distance and/or time interval to travel to complete the flight. For example and without limitation, flight progress may denote that aircraft still have 23 minutes prior to landing.

Still referring to FIG. 1, flight controller 112 is configured to determine an aircraft adjustment 120 as a function of navigation status 116. As used in this disclosure an "aircraft adjustment" is a modification and/or maneuver to be performed by the aircraft. In an embodiment, and without limitation, aircraft adjustment 120 may include one or more adjustments and/or modifications relating to a pitch angle of aircraft. For example, and without limitation, aircraft adjustment 120 may denote that a pitch angle of 2° above a horizon reference should be adjusted to 7° above a horizon reference as a function of one or more actuators acting on an aileron. In another embodiment, and without limitation, aircraft adjustment 120 may include one or more adjustments and/or modifications relating to a position of a propeller blade and/or rotor of aircraft. For example, and without limitation, aircraft adjustment 120 may denote that variable pitch angle of a propeller blade and/or rotor should be modified from a first angle of 2.71° to a second angle of 3.82° as a function of a linear actuator. Additionally or alternatively, and without limitation, aircraft adjustment 120 may include a modification of an aircraft's altitude, thrust, forward thrust, reverse thrust, airspeed velocity, groundspeed velocity, heading direction, pitch angle, approach angle, angle of attack, torque, and the like thereof.

In an embodiment, and still referring to FIG. 1, flight controller 112 may determine aircraft adjustment 120 as a function of identifying a flight deviation. As used in this disclosure a "flight deviation" is one or more divergences from a planned flight path and/or flight plan. For example, and without limitation, flight deviation may denote that an aircraft is 100 km away from a planned flight path line. In an embodiment, and without limitation, identifying flight deviation may include receiving a flight plan. As used in this disclosure a "flight plan" is a written account of the details of a proposed aircraft flight. For example, and without limitation, flight plan may denote one or more flight paths, airway paths, navaid routings, direct routings, and the like thereof. In an embodiment, and without limitation, flight plan may denote one or more standard instrument departure pathways, standard terminal arrival routes, special use airspaces, and the like thereof. In another embodiment, flight plan may denote one or more flight levels alternate airports, flight plan timelines, and the like thereof. In another embodiment, flight plan may denote a standard fuel need, and/or an in-flight emergency fuel need wherein an in-flight emergency fuel need may be determined as a function of a distance from an critical point to an alternate destination, C, and may be calculated as:

$$C = D \cdot O \cdot \sec\theta / 2A$$

where D, is the distance between the destination and the alternate location, O is the groundspeed velocity, A is the airspeed velocity, and θ is the angle between the flight path to the original destination and the alternate destination added and/or subtracted to the drift. Additionally or alternatively, flight controller may identify flight deviation as a function of the flight plan using a threshold limit. As used in this disclosure a "threshold limit" is an aircraft divergence limit from the flight plan. For example, and without limitation, threshold limit may denote that the aircraft may not exceed a deviation of 5 km from the flight plan. As a further non-limiting example, threshold limit may denote that the aircraft may not exceed a deviation of 2° from a heading direction.

In an embodiment, and still referring to FIG. 1, flight controller may determine aircraft adjustment 120 as a function of flight deviation and navigations status 116 using an adjustment machine-learning model. As used in this disclosure an "adjustment machine-learning model" is a machine-learning model to produce an aircraft adjustment output given flight deviations and a navigation statuses as inputs; this is in contrast to a non-machine learning software program where the commands to be executed are determined in advance by a user and written in a programming language. Adjustment machine-learning model may include one or more adjustment machine-learning processes such as supervised, unsupervised, or reinforcement machine-learning processes that flight controller 112 and/or a remote device may or may not use in the generation of aircraft adjustment, wherein a remote device is described below in detail. Additionally or alternatively, adjustment machine-learning model may include one or more adjustment machine-learning processes that a field-programmable gate array (FPGA) may or may not use in the generation of aircraft adjustment. Adjustment machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naive bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 1, adjustment machine learning model may be trained as a function of adjustment training data, wherein adjustment training data may correlate a flight deviation, navigation status to an aircraft adjustment. For example, and without limitation, a flight deviation of a 100 km, a navigation status of a delayed landing may result in an aircraft adjustment of rotating an aileron 3°. Adjustment training data may be received as a function of user-entered valuations of flight deviations, navigation status, and/or aircraft adjustments. Flight controller 112 may receive adjustment training data by receiving correlations of flight deviations and/or navigation statuses to an aircraft adjustment that were previously received and/or determined during a previous iteration of generation of aircraft adjustment. Adjustment training data may be received by one or more remote devices and/or FPGAs that at least correlate a flight deviation, and/or navigation status to an aircraft adjustment. Adjustment training data may be received in the form of one or more user-entered correlations of a flight deviation and/or navigation status to an aircraft adjustment.

Still referring to FIG. 1, flight controller 112 may receive adjustment machine-learning model from a remote device and/or FPGA that utilizes one or more adjustment machine learning processes, wherein a remote device and an FPGA is described below in detail. For example, and without limitation, a remote device may include a computing device, external device, processor, FPGA, microprocessor and the like thereof. Remote device and/or FPGA may perform the adjustment machine-learning process using adjustment training data to generate aircraft adjustment and transmit the output to flight controller 112. Remote device and/or FPGA may transmit a signal, bit, datum, or parameter to flight controller 112 that relates to aircraft adjustment. Additionally or alternatively, the remote device and/or FPGA may provide an updated machine-learning model. For example, and without limitation, an updated machine-learning model may be comprised of a firmware update, a software update, an adjustment machine-learning process correction, and the like thereof. As a non-limiting example a software update may incorporate a new simulation data that relates to a modified flight deviation. Additionally or alternatively, the updated machine learning model may be transmitted to the remote device and/or FPGA, wherein the remote device and/or FPGA may replace the adjustment machine-learning model with the updated machine-learning model and generate the aircraft adjustment as a function of the flight deviation, navigation status, and/or simulation data using the updated machine-learning model. The updated machine-learning model may be transmitted by the remote device and/or FPGA and received by flight controller 112 as a software update, firmware update, or corrected habit machine-learning model. For example, and without limitation adjustment machine learning model may utilize a neural net machine-learning process, wherein the updated machine-learning model may incorporate a gradient boosting machine-learning process.

Still referring to FIG. 1, flight controller 112 is configured to generate an autonomous function 124. As used in this disclosure an "autonomous function" is a mode and/or function of flight controller 112 that controls aircraft automatically. In an embodiment, autonomous function 124 may be configured to enact aircraft adjustment 120 automatically, wherein enacting automatically requires no pilot intervention and/or interaction. For example, and without limitation, autonomous function 124 may perform one or more aircraft adjustments such as but not limited to, aircraft maneuvers, take offs, landings, altitude adjustments, flight leveling adjustments, turns, climbs, and/or descents automatically. As a further non-limiting example, autonomous function may perform one or more aircraft adjustments such as adjusting one or more airspeed velocities, thrusts, torques, and/or groundspeed velocities automatically. In an embodiment, autonomous function 124 may be configured to include a landing function, such as a power-off landing, normal landing, short field landing, soft field landing, tough-and-go landing, stop-and-go landing, precision spot-landing, cleared for 'The Option' landing, and the like thereof. In another embodiment, autonomous function 124 may be configured to include a take-off function, such as but not limited to an assisted take-off, vertical take-off, rocket launch, normal take-off, and the like thereof. As a further non-limiting example, autonomous function may perform one or more flight path corrections and/or flight path modifications.

In an embodiment, and still referring to FIG. 1, autonomous function 124 may include an autonomous modulator. As used in this disclosure an "autonomous modulator" is a circuit and/or device that mitigates and/or limits a degree of autonomy, wherein a degree of autonomy denotes a level of autonomous flight. For example, and without limitation, autonomous modulator may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that a pilot does not have to perform aircraft adjustment 120. As used in this disclosure a "semi-autonomous mode" is a mode that automatically adjusts and/or controls a portion and/or section of aircraft. For example, and without limitation, semi-autonomous mode may denote that a pilot will control the propulsors, wherein the semi-autonomous mode will control the ailerons and/or rudders. As used in this disclosure "non-autonomous mode" is a mode that denotes a pilot will control aircraft and/or maneuvers of aircraft in its entirety. For example, and without limitation, non-autonomous mode may denote that a pilot will perform all of aircraft adjustments 120. In an embodiment, autonomous modulator may be configured to receive an autonomous limiter input. As used in this disclosure an "autonomous limiter input" is an element of data that denotes a desire for autonomy. For example, and without limitation, a pilot may input an element of datum denoting a desire for flight controller 112 to control the propulsors and/or propellers. As a further non-limiting example, a flight control operator may remotely enter an element of datum denoting a desire for flight controller 112 to control all aircraft adjustments and/or landing functions due to pilot being incapacitated. Autonomous function 124 may be modified as a function of autonomous limiter input.

Still referring to FIG. 1, system 100 comprises a pilot display 128. As used in this disclosure a "pilot display" is an output device for presentation of information in visual or tactile form. As a non-limiting example a display device may include liquid crystal display (LCD), a cathode ray tube (CRT), a plasma display, a light emitting diode (LED) display, an electroluminescent (ELD) display, a quantum dot (QLED) display, and the like thereof in any combination. In an embodiment, and without limitation, pilot display 128 may include a primary flight display, multi-function display, and the like thereof. Pilot display 128 is configured to display aircraft adjustment 120 to a user and/or pilot. For example, and without limitation, pilot display 128 may display an aircraft adjustment of increasing a propulsor thrust from a first thrust of 20 N to a second thrust of 400 N. Pilot display 128 is configured to present the autonomous function to the user and/or pilot. In an embodiment, and without limitation, pilot display 128 may receive a pilot signal as a function of presenting autonomous function 124 and enact autonomous function 124 as a function of pilot signal, wherein pilot signal is described below in detail, in reference to FIG. 2. In an embodiment, and without limtiation, pilot display 128 may present an autonomous mode, semi-autonomous mode, and/or non-autonomous function for a user and/or pilot to select. In an embodiment, and without limitation, pilot display 128 may display navigation status 116. For example, and without limitation, pilot display 128 may display information that aircraft is following a flight plan accurately. Additionally or alternatively, pilot display 128 may display navigation status 116 as a function of transforming navigation status 116 into a communicable format. As used in this disclosure a "communicable format" is a manner and/or arrangement of data to communicate information relating to an aircraft. For example, and without limitation, communicable format may include one or more emails, SMS messages, audio signals, visual signals, LED light indicators, vibrations, chemicals, and the like thereof. In an embodiment, pilot display 128 may display aircraft adjustment 120 as a function of transforming aircraft adjustment 120 into a communicable format such as but not limited to a LED indicator. In another embodiment, pilot display 128 may display autonomous function 124 as a function of transforming autonomous function 124 into a communicable format such as a GUI and/or video display.

Still referring to FIG. 1, displaying autonomous function 124 may comprise identifying a noncompliance element. As used in this disclosure a "noncompliance element" is an element of datum denoting a user and/or pilots did not select an autonomous function. For example, and without limitation, noncompliance element may denote a user and/or pilot is sleeping and/or incapacitated. In an embodiment, and without limitation, noncompliance element may include a temporal limit. As used in this disclosure a "temporal limit" is a maximum amount time interval that may be reached. For example, and without limitation, temporal limit may denote that a maximum amount of time may be ten minutes prior to a pilot and/or user requirement to make a selection of autonomous function 124. As a further non-limiting example, temporal limit may denote that a maximum amount of time may be 45 seconds prior to a pilot and/or user requirement to make a selection of autonomous function 124. In another embodiment, noncompliance element may include a divergence limit. As used in this disclosure a "divergence limit" is a maximum amount of flight deviation that may be reached. For example, and without limitation, divergence limit may denote that a maximum amount of altitude change may be 1,000 m. As a further non-limiting example, divergence limit may denote that a maximum amount of force reduction may be 200 N. In an embodiment, flight controller 112 may enact autonomous function as a function of noncompliance element. For example, and without limitation, flight controller 112 may enact autonomous function as a function of a user and/or pilot that is paralyzed. As a further non-limiting example, flight controller 112 may enact autonomous function as a function of a user and/or pilot that is incapacitated.

In an embodiment, and still referring to FIG. 1, system 100 may be configured to include a fault detection module. As used in this disclosure a "fault detection module" is a logic circuit that adjusts one or more voltages as a function of a failure. For example, and without limitation, fault detection module may be configured to detect a failure event of system 100. As used in this disclosure a "failure event" is an element of data identifying a failure of a flight component and/or aircraft has occurred, wherein a flight component is described below in detail, in reference to FIG. 2. In an embodiment and without limitation, failure event may include rotation degradation. As used in this disclosure "rotation degradation" is a reduced function such that a loss of control in the yaw axis occurs. As a non-limiting example, rotation degradation may occur due to a rotor in a quadrotor configuration that is not operating at the capacity necessary to maintain the flight plan, wherein the yaw portion of the torque exerted by the remaining rotors is not eliminated and an uncontrollable yaw axis torque is exerted. In a further embodiment and without limitation, failure event may include a propulsor that is not generating enough torque to maintain the flight plan.

Figure 2:
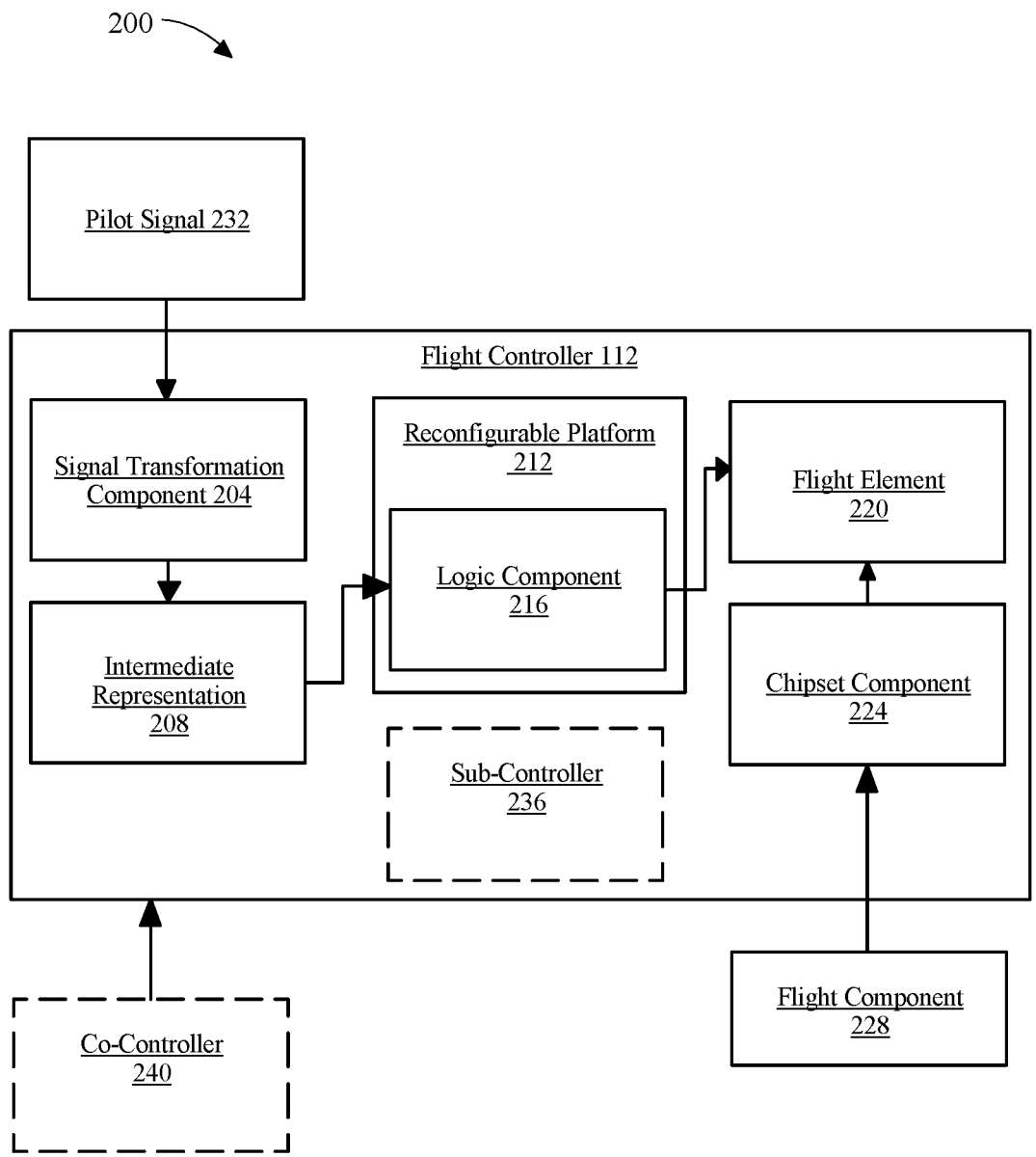
FIG. 2 is a block diagram of an exemplary embodiment of a flight controller.

Now referring to FIG. 2, an exemplary embodiment 200 of a flight controller 112 is illustrated. In an embodiment, and without limitation, flight controller 112 may include a signal transformation component 204. As used in this disclosure a "signal transformation component" is a component that transforms and/or converts a first signal to a second signal, wherein a signal may include one or more digital and/or analog signals. For example, and without limitation, signal transformation component 204 may be configured to perform one or more operations such as preprocessing, lexical analysis, parsing, semantic analysis, and the like thereof. In an embodiment, and without limitation, signal transformation component 204 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 204 may include transforming one or more low-level languages such as, but not limited to, machine languages and/or assembly languages. For example, and without limitation, signal transformation component 204 may include transforming a binary language signal to an assembly language signal. In an embodiment, and without limitation, signal transformation component 204 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 2, signal transformation component 204 may be configured to optimize an intermediate representation 208. As used in this disclosure an "intermediate representation" is a data structure and/or code that represents the input signal. Signal transformation component 204 may optimize intermediate representation as a function of a data-flow analysis, dependence analysis, alias analysis, pointer analysis, escape analysis, and the like thereof. In an embodiment, and without limitation, signal transformation component 204 may optimize intermediate representation 208 as a function of one or more inline expansions, dead code eliminations, constant propagation, loop transformations, and/or automatic parallelization functions. In another embodiment, signal transformation component 204 may optimize intermediate representation as a function of a machine dependent optimization such as a peephole optimization, wherein a peephole optimization may rewrite short sequences of code into more efficient sequences of code. Signal transformation component 204 may optimize intermediate representation to generate an output language, wherein an "output language," as used herein, is the native machine language of flight controller 112. For example, and without limitation, native machine language may include one or more binary and/or numerical languages.

In an embodiment, and without limitation, signal transformation component 204 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 2, flight controller 112 may include a reconfigurable hardware platform 212. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 212 may be reconfigured to enact any algorithm and/or algorithm selection process received from another computing device and/or created using machine-learning processes.

Still referring to FIG. 2, reconfigurable hardware platform 212 may include a logic component 216. As used in this disclosure a "logic component" is a component that executes instructions on output language. For example, and without limitation, logic component may perform basic arithmetic, logic, controlling, input/output operations, and the like thereof. Logic component 216 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 216 may be organized according to Von Neumann and/or Harvard architecture as a non-limiting example. Logic component 216 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 216 may include one or more integrated circuit microprocessors, which may contain one or more central processing units, central processors, and/or main processors, on a single metal-oxide-semiconductor chip. Logic component 216 may be configured to execute a sequence of stored instructions to be performed on the output language and/or intermediate representation 208. Logic component 216 may be configured to fetch and/or retrieve the instruction from a memory cache, wherein a "memory cache," as used in this disclosure, is a stored instruction set on flight controller 112. Logic component 216 may be configured to decode the instruction retrieved from the memory cache to opcodes and/or operands. Logic component 216 may be configured to execute the instruction on intermediate representation 208 and/or output language. For example, and without limitation, logic component 216 may be configured to execute an addition operation on intermediate representation 208 and/or output language.

In an embodiment, and without limitation, logic component 216 may be configured to calculate a flight element 220. As used in this disclosure a "flight element" is an element of datum denoting a relative status of aircraft. For example, and without limitation, flight element 220 may denote one or more torques, thrusts, airspeed velocities, forces, altitudes, groundspeed velocities, directions during flight, directions facing, forces, orientations, and the like thereof. For example, and without limitation, flight element 220 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 220 may denote that aircraft is following a flight path accurately and/or sufficiently.

Still referring to FIG. 2, flight controller 112 may include a chipset component 224. As used in this disclosure a "chipset component" is a component that manages data flow. In an embodiment, and without limitation, chipset component 224 may include a northbridge data flow path, wherein the northbridge dataflow path may manage data flow from logic component 216 to a high-speed device and/or component, such as a RAM, graphics controller, and the like thereof. In another embodiment, and without limitation, chipset component 224 may include a southbridge data flow path, wherein the southbridge dataflow path may manage data flow from logic component 216 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 224 may manage data flow between logic component 216, memory cache, and a flight component 228. As used in this disclosure a "flight component" is a portion of an aircraft that can be moved or adjusted to affect one or more flight elements. For example, flight component 228 may include a component used to affect the aircrafts' roll and pitch which may comprise one or more ailerons. As a further example, flight component 228 may include a rudder to control yaw of an aircraft. In an embodiment, chipset component 224 may be configured to communicate with a plurality of flight components as a function of flight element 220. For example, and without limitation, chipset component 224 may transmit to an aircraft rotor to reduce torque of a first lift propulsor and increase the forward thrust produced by a pusher component to perform a flight maneuver.

In an embodiment, and still referring to FIG. 2, flight controller 112 may be configured generate an autonomous function, wherein an autonomous function is a mode and/or function of flight controller 112 that controls aircraft automatically as described above, in reference to FIG. 1. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 220. In an embodiment, autonomous function may include one or more modes of autonomy such as, but not limited to, autonomous mode, semi-autonomous mode, and/or non-autonomous mode.

In an embodiment, and still referring to FIG. 2, flight controller 112 may generate autonomous function as a function of an autonomous machine-learning model. As used in this disclosure an "autonomous machine-learning model" is a machine-learning model to produce an autonomous function output given flight element 220 and a pilot signal 232 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 232 may denote that a pilot is controlling and/or maneuvering ailerons, wherein the pilot is not in control of the rudders and/or propulsors. In an embodiment, pilot signal 232 may include an implicit signal and/or an explicit signal. For example, and without limitation, pilot signal 232 may include an explicit signal, wherein the pilot explicitly states there is a lack of control and/or desire for autonomous function. As a further non-limiting example, pilot signal 232 may include an explicit signal directing flight controller 112 to control and/or maintain a portion of aircraft, a portion of the flight plan, the entire aircraft, and/or the entire flight plan. As a further non-limiting example, pilot signal 232 may include an implicit signal, wherein flight controller 112 detects a lack of control such as by a malfunction, torque alteration, flight path deviation, and the like thereof. In an embodiment, and without limitation, pilot signal 232 may include one or more explicit signals to reduce torque, and/or one or more implicit signals that torque may be reduced due to reduction of airspeed velocity. In an embodiment, and without limitation, pilot signal 232 may include one or more local and/or global signals. For example, and without limitation, pilot signal 232 may include a local signal that is transmitted by a pilot and/or crew member. As a further non-limiting example, pilot signal 232 may include a global signal that is transmitted by air traffic control and/or one or more remote users that are in communication with the pilot of aircraft. In an embodiment, pilot signal 232 may be received as a function of a tri-state bus and/or multiplexor that denotes an explicit pilot signal should be transmitted prior to any implicit or global pilot signal.

Still referring to FIG. 2, autonomous machine-learning model may include one or more autonomous machine-learning processes such as supervised, unsupervised, or reinforcement machine-learning processes that flight controller 112 and/or a remote device may or may not use in the generation of autonomous function. As used in this disclosure "remote device" is an external device to flight controller 112. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naive bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 2, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 112 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 2, flight controller 112 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 112. Remote device and/or FPGA may transmit a signal, bit, datum, or parameter to flight controller 112 that at least relates to autonomous function. Additionally or alternatively, the remote device and/or FPGA may provide an updated machine-learning model. For example, and without limitation, an updated machine-learning model may be comprised of a firmware update, a software update, a autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 112 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 2, flight controller 112 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 2, flight controller 112 may include, but is not limited to, for example, a cluster of flight controllers in a first location and a second flight controller or cluster of flight controllers in a second location. Flight controller 112 may include one or more flight controllers dedicated to data storage, security, distribution of traffic for load balancing, and the like. Flight controller 112 may be configured to distribute one or more computing tasks as described below across a plurality of flight controllers, which may operate in parallel, in series, redundantly, or in any other manner used for distribution of tasks or memory between computing devices. For example, and without limitation, flight controller 112 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 2, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 228. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 2, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 112. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 208 and/or output language from logic component 216, wherein output language may include one or more analog-to-digital conversions, low bit rate transmissions, message encryptions, digital signals, binary signals, logic signals, analog signals, and the like thereof described above in detail.

Still referring to FIG. 2, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 2, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 2, flight controller 112 may also be implemented using a "shared nothing" architecture in which data is cached at the worker, in an embodiment, this may enable scalability of aircraft and/or computing device. Flight controller 112 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, a node may include, without limitation a plurality of inputs xi that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 2, flight controller may include a sub-controller 236. As used in this disclosure a "sub-controller" is a controller and/or component that is part of a distributed controller as described above; for instance, flight controller 112 may be and/or include a distributed flight controller made up of one or more sub-controllers. For example, and without limitation, sub-controller 236 may include any controllers and/or components thereof that are similar to distributed flight controller and/or flight controller as described above. Sub-controller 236 may include any component of any flight controller as described above. Sub-controller 236 may be implemented in any manner suitable for implementation of a flight controller as described above. As a further non-limiting example, sub-controller 236 may include one or more processors, logic components and/or computing devices capable of receiving, processing, and/or transmitting data across the distributed flight controller as described above. As a further non-limiting example, sub-controller 236 may include a controller that receives a signal from a first flight controller and/or first distributed flight controller component and transmits the signal to a plurality of additional sub-controllers and/or flight components.

Still referring to FIG. 2, flight controller may include a co-controller 240. As used in this disclosure a "co-controller" is a controller and/or component that joins flight controller 112 as components and/or nodes of a distributer flight controller as described above. For example, and without limitation, co-controller 240 may include one or more controllers and/or components that are similar to flight controller 112. As a further non-limiting example, co-controller 240 may include any controller and/or component that joins flight controller 112 to distributer flight controller. As a further non-limiting example, co-controller 240 may include one or more processors, logic components and/or computing devices capable of receiving, processing, and/or transmitting data to and/or from flight controller 112 to distributed flight control system. Co-controller 240 may include any component of any flight controller as described above. Co-controller 240 may be implemented in any manner suitable for implementation of a flight controller as described above.

In an embodiment, and with continued reference to FIG. 2, flight controller 112 may be designed and/or configured to perform any method, method step, or sequence of method steps in any embodiment described in this disclosure, in any order and with any degree of repetition. For instance, flight controller 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 3:
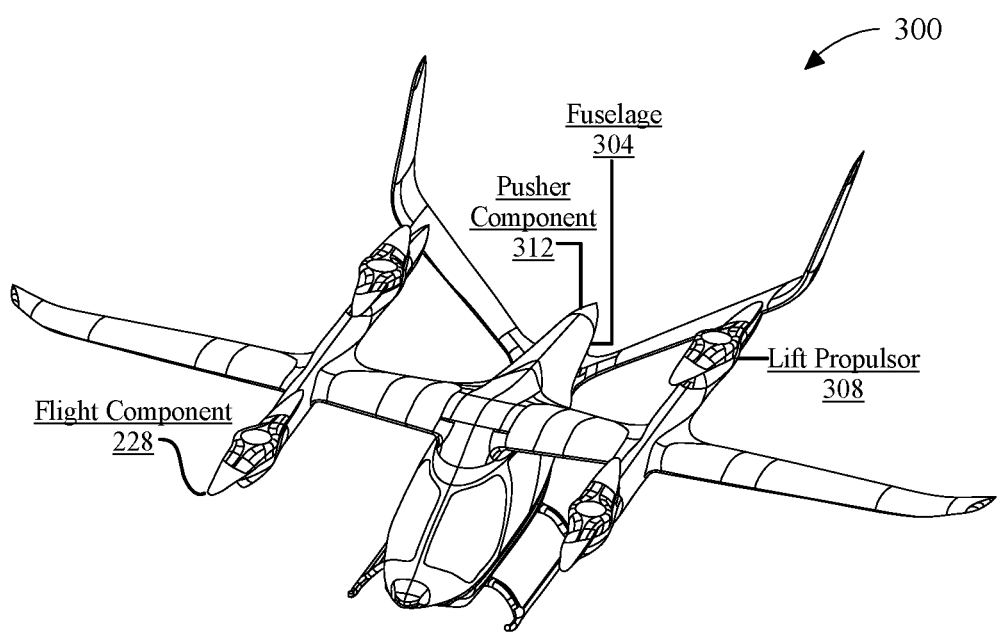
FIG. 3 is a diagrammatic representation of an exemplary embodiment of an electric aircraft.

Now referring to FIG. 3 an exemplary embodiment of an electric aircraft 300 is illustrated. Electric aircraft 300 includes any of the electric aircraft as described above, in reference to FIGS. 1-2. In an embodiment, and without limitation, electric aircraft 300 may include a fuselage 304. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 304 may comprise structural elements that physically support the shape and structure of an aircraft. Structural elements may take a plurality of forms, alone or in combination with other types. Structural elements may vary depending on the construction type of aircraft and specifically, the fuselage. Fuselage 304 may comprise a truss structure. A truss structure is often used with a lightweight aircraft and comprises welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

In embodiments, fuselage 304 may comprise geodesic construction. Geodesic structural elements may include stringers wound about formers (which may be alternatively called station frames) in opposing spiral directions. A stringer, as used herein, is a general structural element that comprises a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of fuselage 304 orthogonal to the longitudinal (nose to tail) axis of the aircraft and forms the general shape of fuselage 304. A former may comprise differing cross-sectional shapes at differing locations along fuselage 304, as the former is the structural element that informs the overall shape of a fuselage 304 curvature. In embodiments, aircraft skin can be anchored to formers and strings such that the outer mold line of the volume encapsulated by the formers and stringers comprises the same shape as electric aircraft 300 when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and still referring to FIG. 3, fuselage 304 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, fuselage 304 can include a semi-monocoque construction. Semi-monocoque construction, as used herein, is a partial monocoque construction, wherein a monocoque construction is describe above detail. In semi-monocoque construction, aircraft fuselage 304 may derive some structural support from stressed aircraft skin and some structural support from underlying frame structure made of structural elements. Formers or station frames can be seen running transverse to the long axis of fuselage 304 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

Still referring to FIG. 3, stringers and formers which account for the bulk of any aircraft structure excluding monocoque construction can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. The location of said stringers greatly informs the type of forces and loads applied to each and every stringer, all of which may be handled by material selection, cross-sectional area, and mechanical coupling methods of each member. The same assessment may be made for formers. In general, formers are significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 3, stressed skin, when used in semi-monocoque construction is the concept where the skin of an aircraft bears partial, yet significant, load in the overall structural hierarchy. In other words, the internal structure, whether it be a frame of welded tubes, formers and stringers, or some combination, is not sufficiently strong enough by design to bear all loads. The concept of stressed skin is applied in monocoque and semi-monocoque construction methods of fuselage 304. Monocoque comprises only structural skin, and in that sense, aircraft skin undergoes stress by applied aerodynamic fluids imparted by the fluid. Stress as used in continuum mechanics can be described in pound-force per square inch ($lbf/in^2$) or Pascals (Pa). In semi-monocoque construction stressed skin bears part of the aerodynamic loads and additionally imparts force on the underlying structure of stringers and formers.

Still referring to FIG. 3, it should be noted that an illustrative embodiment is presented only, and this disclosure in no way limits the form or construction method of a system and method for loading payload into an eVTOL aircraft. In embodiments, fuselage 304 may be configurable based on the needs of the eVTOL per specific mission or objective. The general arrangement of components, structural elements, and hardware associated with storing and/or moving a payload may be added or removed from fuselage 304 as needed, whether it is stowed manually, automatedly, or removed by personnel altogether. Fuselage 304 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 304 may also be configurable to accept certain specific cargo containers, or a receptable that can, in turn, accept certain cargo containers.

Still referring to FIG. 3, aircraft 300 may include a plurality of laterally extending elements attached to fuselage 304. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 3, aircraft 300 includes a plurality of flight components 224, wherein a flight component is described above, in detail, in reference to FIGS. 1-2. In an embodiment, flight component 224 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 3, the plurality of flight components 224 may include at least a lift propulsor 308. As used in this disclosure a "propulsor" is a component and/or device used to propel a craft upward by exerting force on a fluid medium, which may include a gaseous medium such as air or a liquid medium such as water. Propulsor 308 may include any device or component that consumes electrical power on demand to propel an electric aircraft in a direction or other vehicle while on ground or in-flight. For example, and without limitation, propulsor 308 may include a rotor, propeller, paddle wheel and the like thereof. In an embodiment, propulsor 308 may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment, propulsor 308 may include a rotating power-driven hub, to which are attached several radial airfoil-section blades such that the whole assembly rotates about a longitudinal axis.

In an embodiment, and still referring to FIG. 3, the plurality of flight components 224 may include one or more power sources. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, power source may include an inverter. As used in this disclosure an "inverter" is a device that changes one or more currents of a system. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may comprise a square wave, sine wave, modified sine wave, near sine wave, and the like thereof.

Still referring to FIG. 3, power source may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 300 may be incorporated.

In an embodiment, and still referring to FIG. 3, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 3, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

Still referring to FIG. 3, plurality of flight components 224 may include a pusher component 316. As used in this disclosure a "pusher component" is a component that pushes and/or thrusts an aircraft through a medium. As a non-limiting example, pusher component 316 may include a pusher propeller, a paddle wheel, a pusher motor, a pusher propulsor, and the like. Additionally, or alternatively, pusher flight component may include a plurality of pusher flight components. Pusher component 316 may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force aircraft to in a horizontal direction along the longitudinal axis. As a further non-limiting example, pusher component 316 may twist and/or rotate to pull air behind it and, at the same time, push aircraft 300 forward with an equal amount of force. In an embodiment, and without limitation, the more air forced behind aircraft, the greater the thrust force with which the aircraft is pushed horizontally will be. In another embodiment, and without limitation, forward thrust may force aircraft 300 through the medium of relative air. Additionally or alternatively, plurality of flight components 224 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Figure 4:
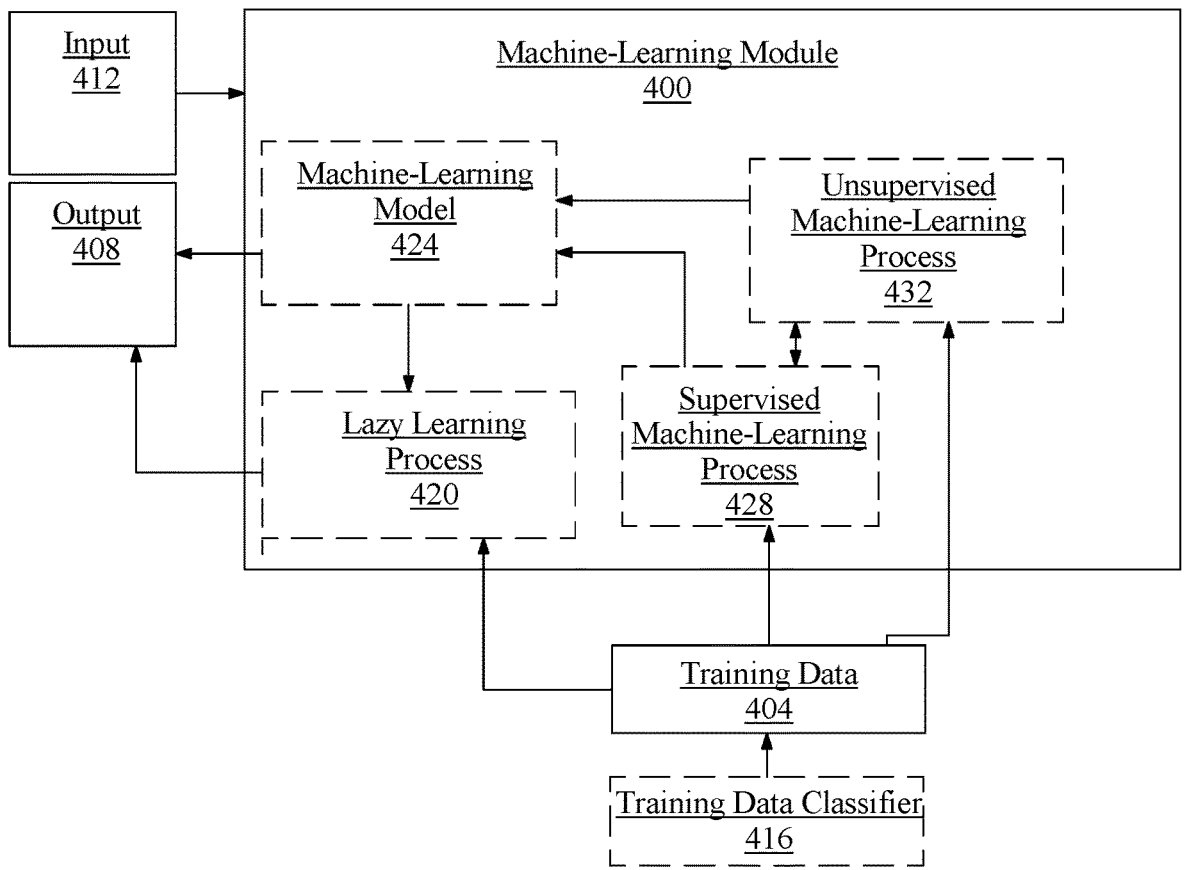
FIG. 4 is a block diagram of an exemplary embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example flight elements and/or pilot signals may be inputs, wherein an output may be an autonomous function.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
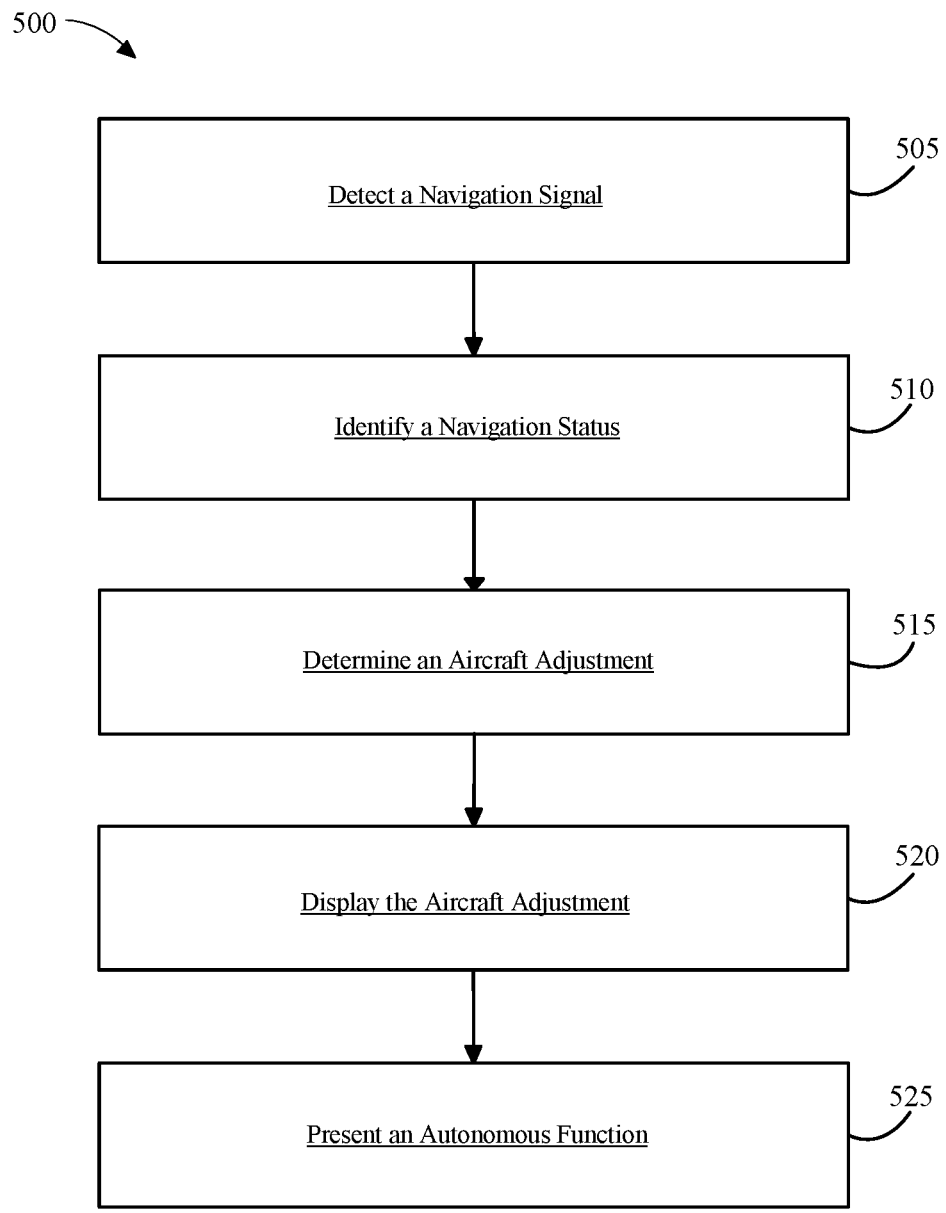
FIG. 5 is a flow diagram of an exemplary embodiment of a method for electric aircraft navigation.

Now referring to FIG. 5, a method of an exemplary embodiment 500 of a system for electric aircraft navigation is illustrated. At step 505, a sensor 104 detects a navigation signal 108. Sensor 104 includes any of the sensor 104 as described above, in reference to FIGS. 1-4. Navigation signal includes any of the navigation signal 108 as described above, in reference to FIGS. 1-4.

Still referring to FIG. 5, at step 510, a flight controller 112 identifies a navigation status 116 as a function of navigation signal 108. Flight controller 112 includes any of the flight controller 112 as described above, in reference to FIGS. 1-4. Navigation status 116 includes any of the navigations status 116 as described above, in reference to FIGS. 1-4.

Still referring to FIG. 5, at step 515, flight controller 112 determines an aircraft adjustment 120 as a function of navigation status 116. Aircraft adjustment 120 includes any of the aircraft adjustment 120 as described above, in reference to FIGS. 1-4.

Still referring to FIG. 5, at step 520, a pilot display 128 displays aircraft adjustment 120. Pilot display 128 includes any of the pilot display 128 as described above, in reference to FIGS. 1-4.

Still referring to FIG. 5, at step 525, pilot display 128 presents an autonomous function 124. Autonomous function

124 includes any of the autonomous function 124 as described above, in reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
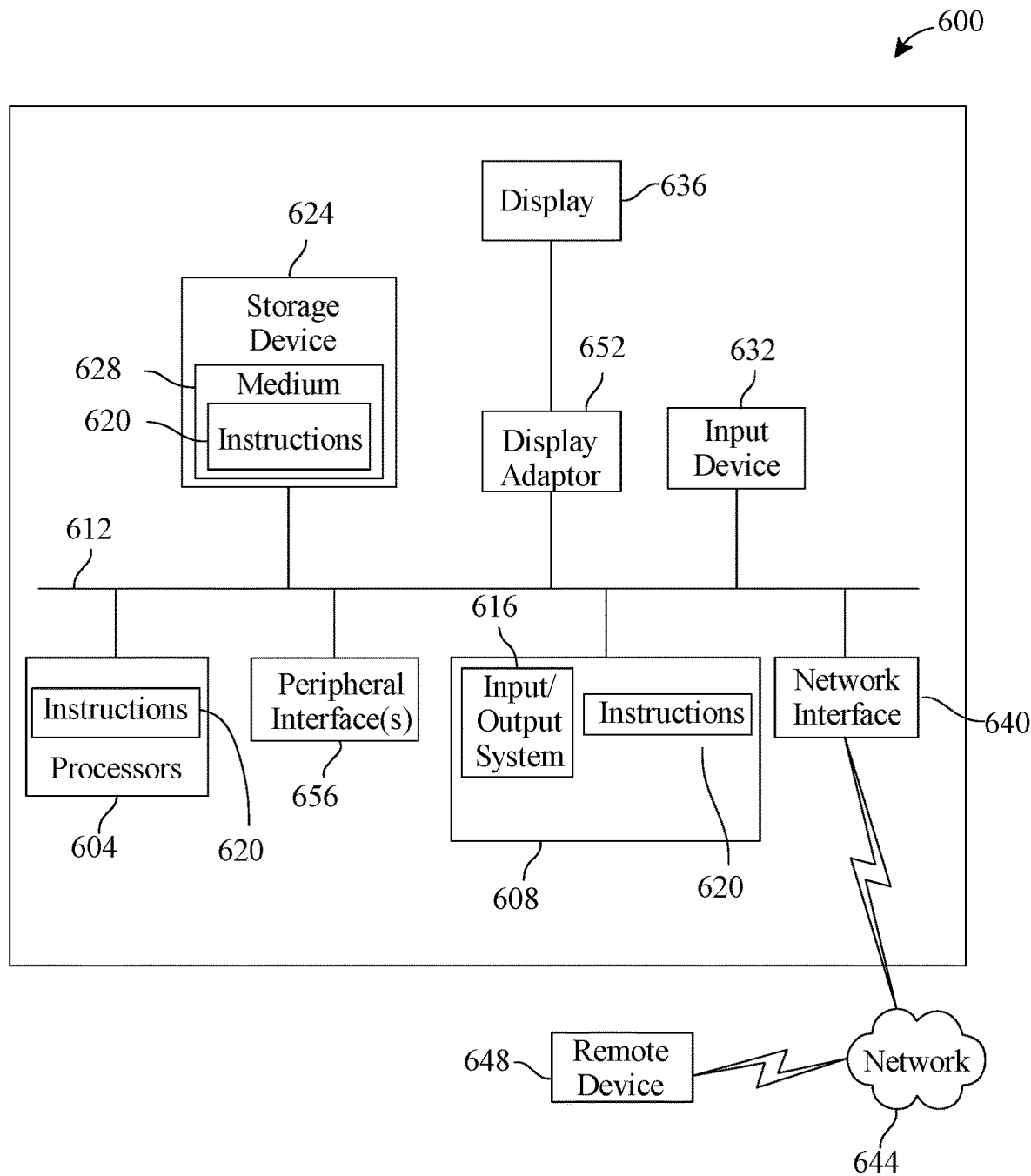
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 6632. Examples of an input device 32 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display device 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 662 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 662 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 666. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for electric aircraft navigation, the system comprising:
   a sensor configured to detect a navigation signal;
   a flight controller, wherein the flight controller is configured to:
      receive the navigation signal;
      determine an aircraft adjustment as a function of the navigation signal; and
      generate an autonomous function configured to enact the aircraft adjustment in part by controlling at least a propulsor of an electric aircraft, wherein the at least a propulsor is electrically powered; and
   a pilot display located within the electric aircraft, wherein the pilot display is configured to:
      display the aircraft adjustment to a user.

2. The system of claim 1, wherein the sensor includes an optical sensor configured to:
   identify a topographical datum; and
   calculate an in-air position as a function of the topographical datum.

3. The system of claim 1, wherein the sensor includes a ranging sensor configured to:
   receive a temporal indicator; and
   calculate a distance as a function of the temporal indicator and the navigation signal.

4. The system of claim 1, wherein the navigation signal includes an inertial measurement.

5. The system of claim 1, wherein presenting the autonomous function further comprises:
   receiving a pilot signal; and
   enacting the autonomous function as a function of the pilot signal.

6. The system of claim 1, wherein the autonomous function includes a landing function.

7. The system of claim 1, wherein the autonomous function includes a take-off function.

8. The system of claim 1, wherein presenting the autonomous function further comprises:
   identifying a noncompliance element; and
   enacting the autonomous function as a function of the noncompliance element.

9. The system of claim 8, wherein the noncompliance element includes a temporal limit.

10. The system of claim 8, wherein the noncompliance element includes a divergence limit.

11. A method of electric aircraft navigation, the method comprising:
   detecting, using a sensor, a navigation signal;
   receiving, using a flight controller, the navigation signal;
   determining, using the flight controller, an aircraft adjustment as a function of the navigation signal;
   generating, using the flight controller, an autonomous function configured to enact the aircraft adjustment in part by controlling at least a propulsor of an electric aircraft, wherein the at least a propulsor is electrically powered; and displaying, using a pilot display located within the electric aircraft, the aircraft adjustment to a user.

12. The method of claim 11, wherein the sensor includes an optical sensor and further comprising:

identifying, using the optical sensor, a topographical datum; and calculating, using the optical sensor, an in-air position as a function of the topographical datum.

13. The method of claim 11, wherein the sensor includes a ranging sensor and further comprising:

receiving, using the ranging sensor, a temporal indicator; and calculating, using the ranging sensor, a distance as a function of the temporal indicator and the navigation signal.

14. The method of claim 11, wherein the navigation signal includes an inertial measurement.

15. The method of claim 11, wherein presenting the autonomous function further comprises:

receiving a pilot signal; and enacting the autonomous function as a function of the pilot signal.

16. The method of claim 11, wherein the autonomous function includes a landing function.

17. The method of claim 11, wherein the autonomous function includes a take-off function.

18. The method of claim 11, wherein presenting the autonomous function further comprises:

identifying a noncompliance element; and enacting the autonomous function as a function of the noncompliance element.

19. The method of claim 18, wherein the noncompliance element includes a temporal limit.

20. The method of claim 18, wherein the noncompliance element includes a divergence limit.

\* \* \* \* \*